United States Patent
Luh

(10) Patent No.: US 7,505,842 B2
(45) Date of Patent: Mar. 17, 2009

(54) METHOD FOR CONFIGURING A TRANSMISSION CONTROL FOR MOTOR VEHICLES

(75) Inventor: Joachim Luh, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 600 days.

(21) Appl. No.: 10/514,024

(22) PCT Filed: Mar. 6, 2003

(86) PCT No.: PCT/DE03/00702

§ 371 (c)(1),
(2), (4) Date: Jun. 21, 2005

(87) PCT Pub. No.: WO03/098075

PCT Pub. Date: Nov. 27, 2003

(65) Prior Publication Data

US 2006/0015234 A1    Jan. 19, 2006

(30) Foreign Application Priority Data

May 22, 2002    (DE) ................... 102 22 665

(51) Int. Cl.
*G16G 59/02*    (2006.01)
*G06F 19/00*    (2006.01)

(52) U.S. Cl. .................. 701/55; 701/51; 701/56; 477/43

(58) Field of Classification Search ........... 701/51, 701/55, 56, 61; 477/43, 110
See application file for complete search history.

(56) References Cited

U.S. PATENT DOCUMENTS

| 5,031,100 | A | * | 7/1991 | Takahashi | 701/55 |
| 5,467,277 | A | * | 11/1995 | Fujisawa et al. | 701/51 |
| 5,941,922 | A | * | 8/1999 | Price et al. | 701/51 |
| 5,983,154 | A | * | 11/1999 | Morisawa | 701/56 |
| 6,006,151 | A | * | 12/1999 | Graf | 701/57 |
| 6,427,108 | B1 | * | 7/2002 | Kanasugi et al. | 701/51 |
| 6,544,141 | B1 | * | 4/2003 | Fuchs et al. | 477/44 |
| 6,577,939 | B1 | * | 6/2003 | Keyse et al. | 701/55 |
| 6,634,982 | B2 | * | 10/2003 | Miki et al. | 477/45 |

FOREIGN PATENT DOCUMENTS

DE    44 41 896    5/1996

(Continued)

OTHER PUBLICATIONS

Automobiltechnische Zeitschrift (Automotive Engineering Magazine), vol. 95, 1993, p. 420, "Die adaptive Getriebesteuerung für BMW-Automobile" (Adaptvie Transmission Control for BMW Automobiles).

*Primary Examiner*—Tan Q Nguyen
(74) *Attorney, Agent, or Firm*—Kenyon & Kenyon LLP

(57) ABSTRACT

A method for configuring an electronic transmission control unit of an automatic transmission in a motor vehicle. Selectable shift programs are offered to a user of the motor vehicle at an input unit for configuring the electronic transmission control unit. From the shift programs offered, the user selects individual shift programs by activation/deactivation and optionally alters shift-program parameters as desired. Based on the shift programs selected in a user-individual manner from the shift programs offered, the electronic transmission control unit is configured in a user-individual manner by signal transmission or via voice input.

22 Claims, 3 Drawing Sheets

| | FOREIGN PATENT DOCUMENTS | | |
|---|---|---|---|
| DE | 199 63 782 | 7/2001 | |
| EP | 0 513 424 | 11/1992 | |
| EP | 1 045 173 | 10/2000 | |
| FR | 2 699 978 | 7/1994 | |
| JP | 8-128529 | 5/1996 | |
| JP | 8-135783 | 5/1996 | |
| JP | 10-264741 | 10/1998 | |
| JP | 10-306869 | 11/1998 | |
| JP | 11-325234 | 11/1999 | |
| JP | 2000-320657 | 11/2000 | |
| JP | 2001-227633 | 8/2001 | |
| WO | WO 01/86175 | 11/2001 | |

* cited by examiner

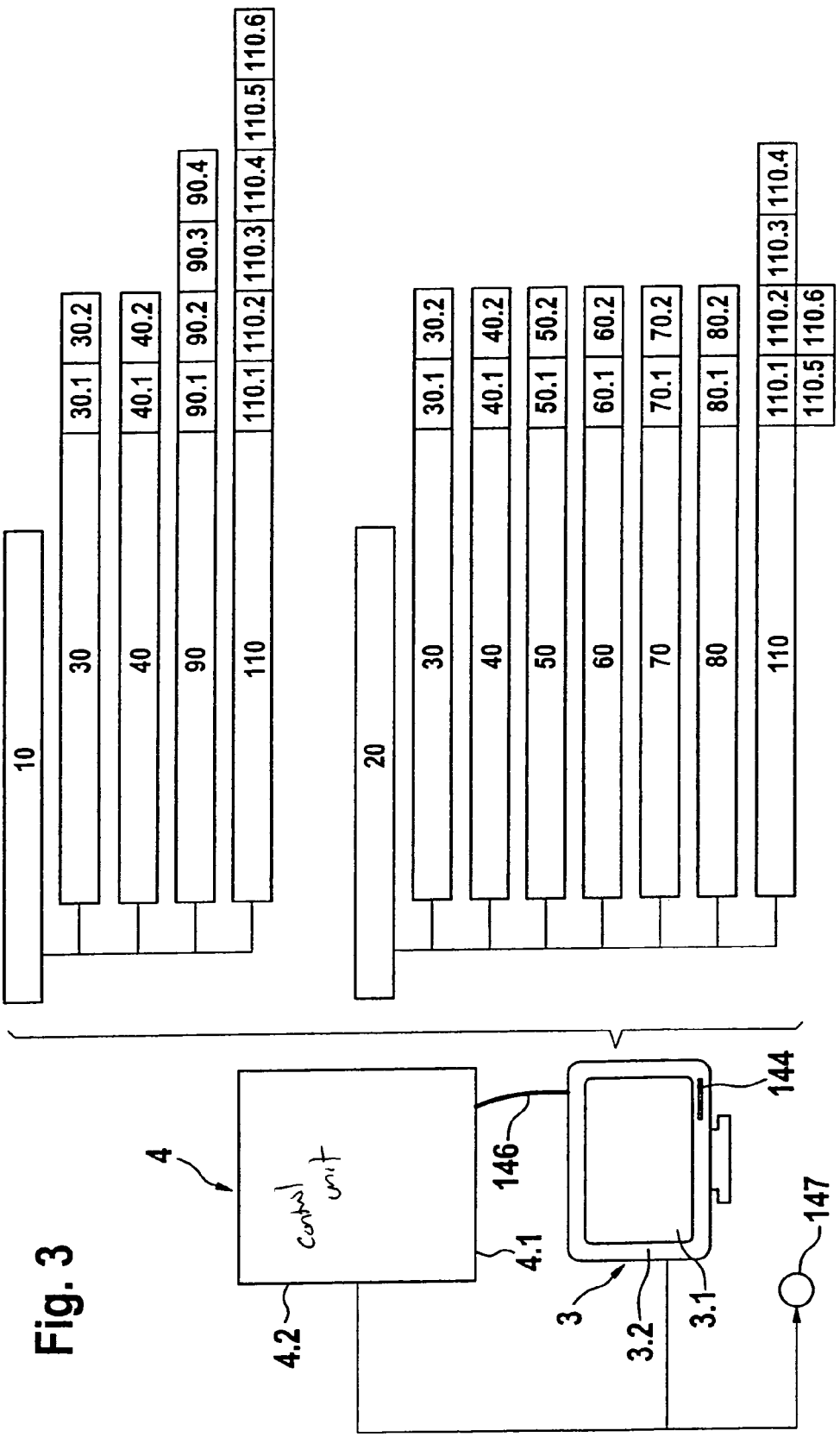

METHOD FOR CONFIGURING A TRANSMISSION CONTROL FOR MOTOR VEHICLES

BACKGROUND INFORMATION

Automatic transmissions are increasingly being used in motor vehicles to relieve the driver from gear-shift operations, particularly in large-city traffic, which could distract his/her attention from traffic events. Newer-generation automatic transmissions are safer and easier to operate. The transmission control of automatic transmissions may be influenced with respect to the driving modes "sport" or "comfort" via a selection to be made on the part of the driver at an operating switch or a push-button switch.

German Patent Application No. DE 199 63 782 relates to a control for a vehicle having a transmission control. A plurality of electrical switching elements, such as a kickdown switch, a brake-lights switch or a selector-lever position switch exchange signals with a transmission control. The same holds true for other switching elements such as a manual-mode switch, an upshift transducing sensor or a downshift transducing sensor, as well as for a program-selector switch (economy/sport switch). The associated signal lines are run to a control unit that is connected to a serial bus system (CAN). The combined, transmitted signals are conducted via the CAN data bus to the transmission control.

German Patent No. DE 44 41 896 relates to the control for a motor vehicle having an automatic transmission. The transmission control of the motor vehicle is connected by signal lines to a selector lever, a kickdown switch and a driving-program selector switch. The driver of the motor vehicle inputs his/her commands or wishes into the transmission control via these interfaces. Driving positions P, R, N, S, 1 and 2 are selected via the selector lever, the demand for a sharp acceleration is made via the kickdown switch, and the choice between an "economy" and a "sport" driving program is made via the driving-program selector switch.

In the Automobiltechnische Zeitschrift (Automotive Engineering Magazine) volume 95, year 1993, p. 420 ff. in "Die adaptive Getriebesteuerung für BMW-Automobile" (Adaptive Transmission Control for BMW Automobiles), an adaptive transmission control (ATC) is described by which the ratio of transmission may be adapted to the behavior of the driver and the environmental conditions prevailing in each instance. Moreover, the adaptive transmission control ATC evaluates a plurality of further parameters. In this context, the accelerator has the greatest influence on the gear selection. Thus, given a quick let-up on the accelerator, upshifts are prevented, and downshifts are triggered (kickdown) in response to complete depression of the accelerator. In addition to these well-known functions, the ATC includes a multitude of less striking features which contribute to an intelligent gear selection in widely varying driving situations. Besides the gear selection, the transmission control controls the sequences of gear shifts, executes diverse safety functions and documents possibly occurring errors for the subsequent diagnostic. The multitude of complex tasks requires the use of highly developed hardware and extensive software. Until now, the gear selection of automatic transmissions was made taking into consideration the throttle angle, the speed at the transmission output, the position of the kickdown switch and selector-lever switch, as well as the actuation of the program-selector pushbutton. Only a little new information was made available to the control unit to enable consideration of the additional aspects which the ATC utilizes for optimizing the gear selection. One innovation is the processing of the four-wheel speed information supplied via the ABS control unit. The longitudinal acceleration and lateral acceleration of the vehicle, as well as the slippage of the driven wheels may be derived from these values. Moreover, the brake-lights switch is queried in order to detect the actuation of the brake pedal. In automobiles equipped with an automatic stability control (ASC), the pushbutton by which the driver is able to deactivate this system is also queried. To derive the suitable transmission ratio from the diverse input information, two tasks, namely, the shift-program selection and the gear selection are executed in the transmission control. First of all, a shift program must be stipulated. When working with conventional transmission controls, this is accomplished in that the driver, using the program-selection pushbutton, selects, for example, economy program, sport program and winter program from an easily comprehensible offering of programs. Given a selection of nine shift programs, however, this would place too great a demand on the driver, so that there should be software support. To that end, functions have been introduced within the framework of the adaptive transmission control ATC which evaluate the behavior of the driver based on his/her measurable actions. The position and the movement of the accelerator, the instantaneous traveling speed, the actuation of the kickdown switch and the occurrence of lateral accelerations are analyzed. The linkage of this information supplies a "driver-type characteristic", resulting in the call-up of one of four basic programs. Under special environmental conditions, special programs are used. Thus, on a slippery roadway, a winter shift program is used to increase traction and directional stability. When driving on uphill stretches or under unusual load, programs oriented toward vehicle performance are used which are able to help in reducing the frequency of shifting under these conditions.

The gear selection is subsequently made, taking the ascertained program as a basis. To that end, by way of upshift and downshift characteristic curves, a connection is produced between the measured values for traveling speed and throttle angle, respectively, at the gear changes. The shifting characteristics are basically obtained in such a way that upshifts are initiated by let-up of the accelerator or increasing velocity—downshifts by depression of the accelerator or reduction of the velocity. The fixed relation between the shifting characteristic and the gear selection is canceled by several functions of the adaptive transmission control ATC. Thus, upshifts which would take place according to characteristic curves may be prevented, or downshifts may be triggered even when no downshift characteristic was exceeded.

SUMMARY

The design approach of the present invention makes it possible to configure an electronic transmission control for an automatic transmission of a motor vehicle in a manner individual to the driver, using a driver-information system in the vehicle. Previously, a selection may be made in automatic transmissions between a "sport" operating mode, an "economy" operating mode and an operating mode adapted to wintry road conditions. Using the design approach according to in the present invention, the various shift programs offered by the electronic transmission control may be configured, i.e., adapted, in a manner specific to the driver. The criteria according to which the suitable transmission ratio of the automatic transmission is established in the electronic transmission control may be influenced individually by the driver. The individual criteria may be activated, deactivated or even altered by the driver.

For example, a sporty shift program may be activated or deactivated by a control unit underlaying the driver-information system. Generally, only one shift program (economy, sport, fast-off, kickdown) is activated at one point of time, since the automatic transmission must select one gear. It may be different for CVT (continuously variable transmission) automatic transmissions, since finer graduations of the adjustable gears are possible. The functions "converter lockup clutch" and "standing decoupling" are independent of the gear to be engaged.

For example, within a "sport" shift program, it is possible to establish the number of gears used in the shift program, as well as the shifting conditions in which the automatic transmission shifts up or shifts down. Moreover, it is possible to establish the speed of the gear change within a shift program, so that the speed of the gear change standardly provided may be varied individually and adapted to the driving style.

Moreover, a kickdown shift program may be activated or deactivated by the input of the driver. Within a shift program which takes into account an economically oriented driving style, this may lead to a complete deactivation of the kickdown shift-program module. Moreover, a fast-off shift function, which always becomes active as soon as the driver quickly releases the accelerator, may be activated or deactivated. Within the fast-off shift program, a threshold value may be decreased or increased by the configurability of the electronic transmission control. The fast-off function is activated or deactivated when there is a drop below this threshold value or it is exceeded. An upshift of the transmission may be prevented or the number of gears shifted up may be reduced by the fast-off function.

For driving in the mountains, thus, for example, long uphill-grade drives (pass drives), the driver may activate a mountain shift program, for instance, which may be expanded by a function "driving with or without trailer." This shift program may be supplemented both by a curve shift program and by a downgrade shift program and/or a winter shift program. Accordingly, the driver is able to configure the operating mode of an automatic transmission according to his/her individual requirements, and, by preselection, is able to take the conditions under which his/her motor vehicle will shortly be operated into account to the greatest extent possible. Activation of the functions downhill driving/curvy section/operation with trailer combined with the winter shift program is able to relieve the driver from routine activities to the greatest extent possible when driving through mountain passes under wintry road conditions with a hitched camper, so that the driver is able to devote his/her undivided attention to traffic events.

Theoretically, for CVT automatic transmissions, there is an infinite number of transmission ratios, i.e., gears. To permit the driver to shift manually, a 5-, 6- or even 7-gear manually shifted transmission is simulated. The number of combinations of vehicle speed and transmission ratio selectable by the driver is limited to the 5, 6 or 7 gears simulated in each case.

The possibilities, presented and described by way of example, for configuring transmission shift programs of an automatic transmission may be implemented, for instance, via a selection menu on a display of the driver information system within the vehicle. Instead of via a driver information system permanently installed in the motor vehicle, the configuration could also be effected via a mobile interface in the form of a mobile telephone or via a PDA (personal digital assistant). These components are able to exchange data via a shared interface (blue tooth) with the transmission control unit of an automatic transmission for configuring it in a driver-individual manner. The data defining a driver-individual shift-program configuration may also be stored on a chip card which permits a user-dependent setting of a shift program for an electronic transmission control.

For example, the configuration of the shift program may be transmitted from the control unit of the driver information system directly to the electronic transmission control after the ignition is switched on. Changes in the configuration are transmitted to the electronic transmission control during running operation. The communication between the electronic transmission control of the automatic transmission and the driver information system takes place, for example, with the aid of a serial bus system (CAN) which implements the signal exchange between the control units of the driver information system and of the automatic transmission.

BRIEF DESCRIPTION OF THE DRAWINGS

FIG. 3 shows the shift-program functions in hierarchical arrangement, combined to form individual "function packets", which are able to be influenced individually by the driver.

DESCRIPTION OF EXAMPLE EMBODIMENTS

Figure 1:
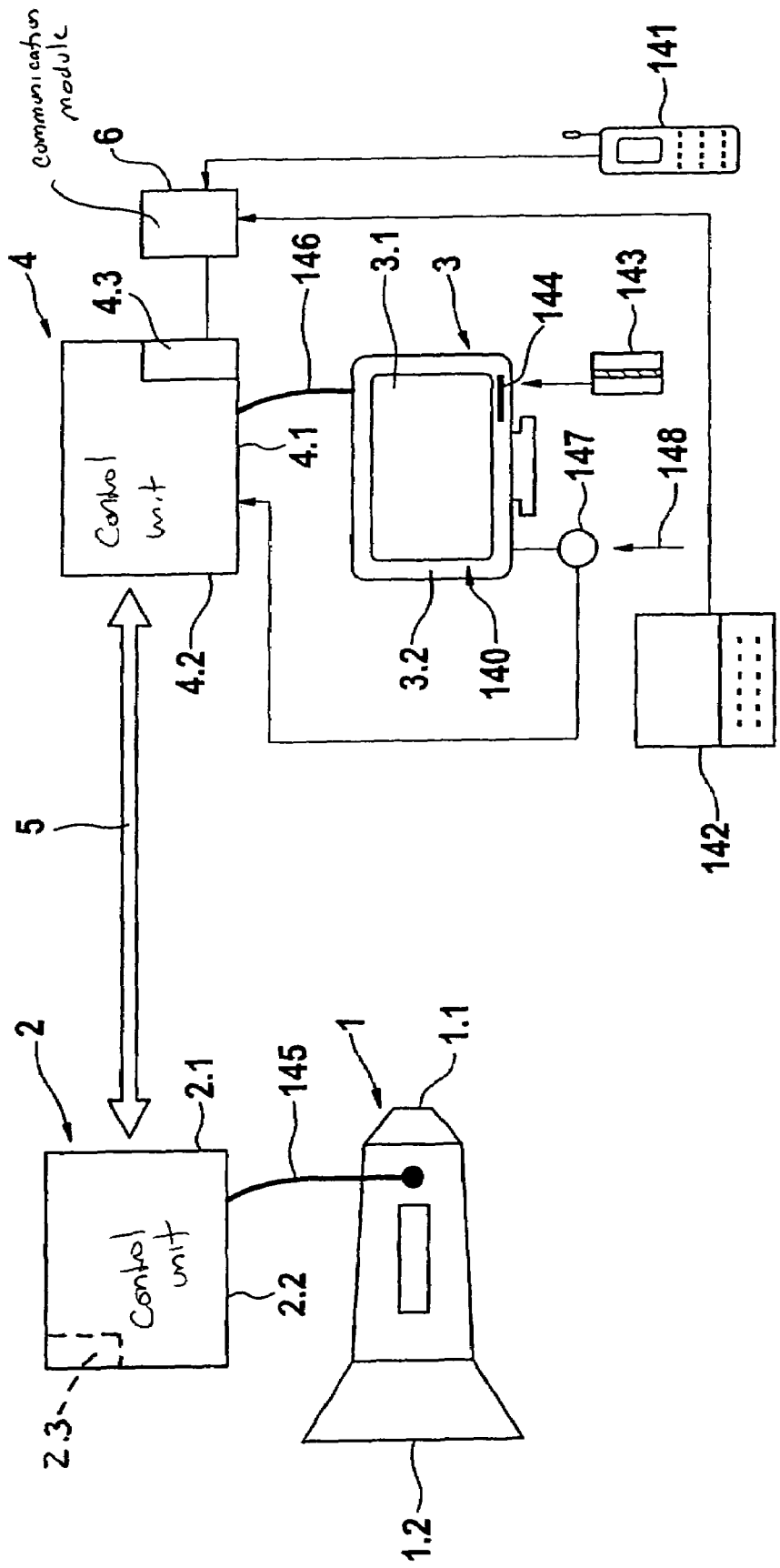
FIG. 1 shows an electronically controlled transmission control unit for an automatic transmission which is configurable from the control unit of a driver information system via a bidirectionally operating bus.

FIG. 1 shows an electronically controlled transmission control unit 2 for an automatic transmission 1 which may be configured in a manner specific to the driver via control unit 4 of a driver information system 3 by way of a bidirectional data bus (CAN) in the vehicle. An electronic transmission control unit 2 is assigned to an automatic transmission of a motor vehicle, which may be provided as a stepped automatic transmission AT, as an automated, manually-shifted transmission AMT or as a continuously variable automatic transmission CVT. On automatic transmission 1, the drive end is designated by reference numeral 1.2; at this interface, the engine transmits its torque to automatic transmission 1, while the output end of automatic transmission 1 facing the drivetrain, i.e. the axle drive, is designated by reference numeral 1.1. Electronic transmission control unit 2 and automatic transmission 1 are interconnected via signal and control lines 145. Control unit 4 and driver information system 3 may form one unit, namely, the driver information system. Control unit 2 and transmission 1 may likewise be regarded as one structural unit, namely, as the automatic transmission. Electronic control unit 4 may include an interface for a mobile telephone or a PDA, designated in FIG. 1 by position 4.3, which is able to be addressed via a communication module 6 for the mobile telephone/PDA. Communication module 6 may be addressed both via mobile telephone 141 and PDA 142, as indicated schematically in FIG. 1. The side assigned to (facing) automatic transmission 1, i.e., the output side of electronic transmission control unit 2, is designated by reference numeral 2.2, while the side of electronic transmission control unit 2 assigned to (facing) a vehicle-internal bus system is identified by reference numeral 2.1.

Within a motor vehicle, electronic transmission control unit 2 may be connected via a serial bus system 5 (CAN) to an electronic control unit, and exchange data with it via this serial bus system. On its part, electronic control unit 4 of the driver information system is connected via further control and signal lines 146 to a driver information system 3, permanently installed in the vehicle, whose display-screen surface is shown schematically in FIG. 1. The side of electronic control unit 4 assigned to (facing) an interactive driver information system 3 is designated by reference numeral 4.1, while the side of electronic control unit 4 of interactive driver information system 3 opposite serial bus system 5 on the input side is designated by reference numeral 4.2. Serial bus system 5 integrated in the vehicle exchanges information and data in both directions between electronic transmission control unit 2 and electronic control unit 4, that is to say, is therefore bidirectional.

Interactive driver information system 3, permanently installed in the vehicle, includes a display 3.1 formed, for example, as touch screen 3.2. Offered on display 3.1 of interactive driver information system 3 are configuration criteria (see representation according to FIGS. 2 and 3) in menu form 140, from which the user of the motor vehicle is able to put together a user-individual configuration of shift programs which are able to be transmitted to electronic transmission control unit 2 and which permit a driving operation of the motor vehicle in accordance with the inputs made in a user-individual manner.

On one hand, display 3.1 of interactive driver information system 3 may be used while driving as a navigation-system screen, while on the other hand, before beginning each trip, be it a city drive, a long-distance drive, a vacation drive in the mountains, to name only a few possible examples, electronic transmission control unit 2 of automatic transmission 1 may be configured individually via selection menu 140 able to be displayed in display 3.1. In addition to an input of individual transmission configurations for transmitting via serial bus system 5 to electronic transmission control unit 2, the desired transmission shift-program configuration may be input via an interface permitting voice input 148, such as a microphone 147, at interactive driver information system 3, and transmitted to electronic control unit 4. Besides the voice input via a voice interface 147 in the form of a microphone, by way of a chip card 143 insertable into an insertion slot 144 on interactive driver information system 3, a transmission configuration desired individually by the user may be transmitted to electronic control unit 4 via signal line 146, and to electronic transmission control unit 2 via data bus 5 connected to electronic transmission control unit 2.

Instead of configuring an electronic transmission control unit 2 via an interactive driver information system 3 permanently installed in the vehicle, it is also possible to directly address an interface 2.3 on electronic transmission control unit 2 via a personal digital assistant (PDA) 142 or via a mobile telephone 141. By way of optional interface 2.3 able to be provided on electronic transmission control unit 2, the bandwidth of the available selectable shift programs may be displayed both on the display of personal digital assistant 142 (PDA) and on the display of mobile telephone 141. The shift programs may be run through by the user via confirmation or acknowledgment signals either chronologically or sequentially, or put together previously in hierarchical packets. The individual selectable shift programs are deactivated, activated or able to be configured with respect to their operating parameters such as, for example, speed of the gear change or preselection of a number of gears.

Accordingly, available to the user are a user surface, provided as touch screen 3.2, of an interactive driver information system 3 for configuring electronic transmission control unit 2, a voice input via an interface 147 in the form of a microphone at interactive driver information system 3, an insertion slot 144 for inserting a chip card 143 having the stored, desired shift-program configuration, as well as two mobile configuration possibilities in the form of a mobile telephone 141 and a personal digital assistant 142, respectively, in case the user should prefer such a possibility for configuring the shift programs of an automatic transmission 1 via an electronic transmission control unit 2.

Figure 2:
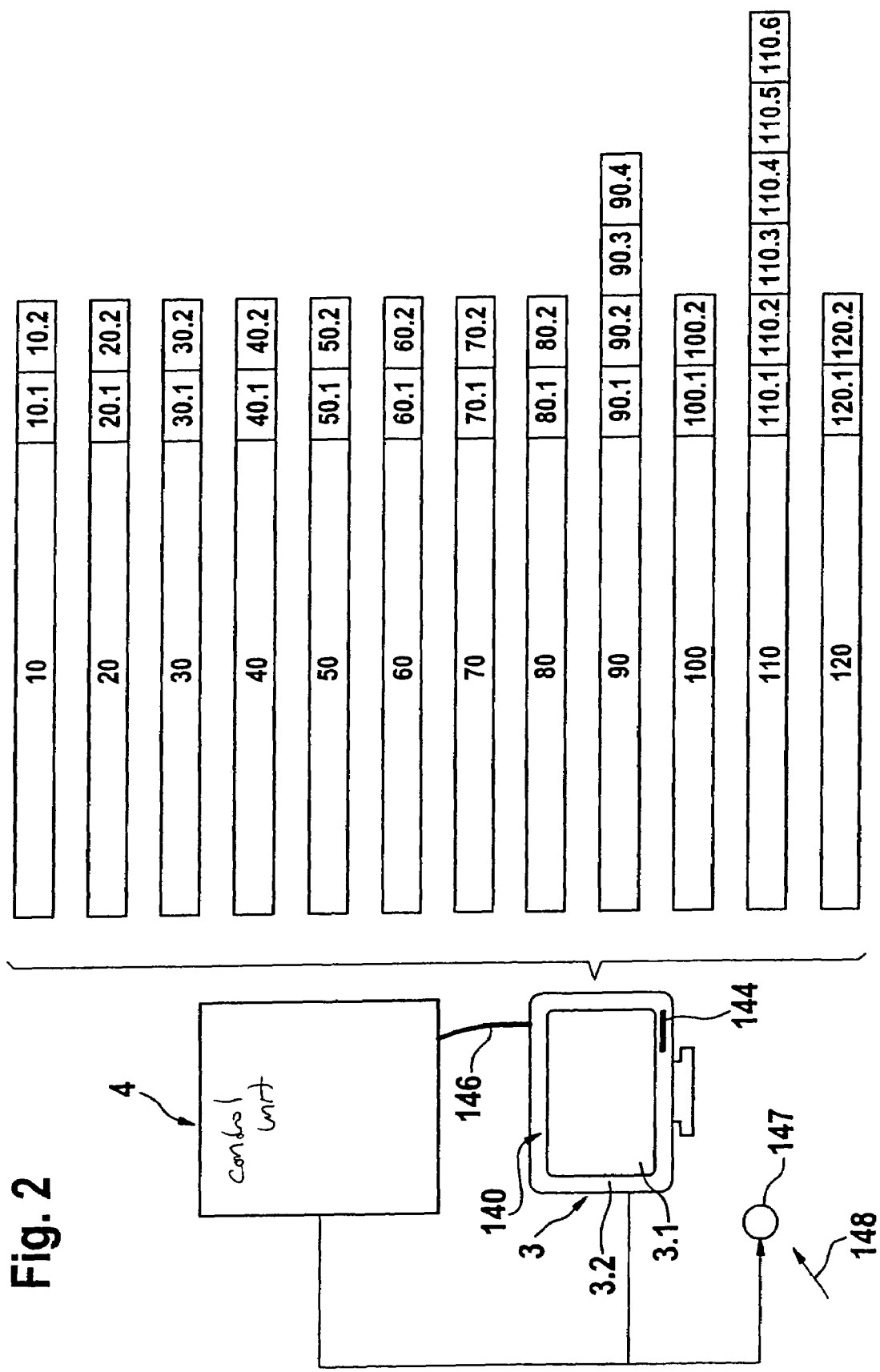
FIG. 2 shows the activatable/deactivatable/changeable functions of a shift program which are able to be influenced by the driver information system.

FIG. 2 shows the activatable/deactivatable/changeable functions of a shift program, of shift-program modules, which are able to be influenced by an interactive driver information system.

FIG. 2 shows an electronic control unit 4 which is connected via a second signal line 146 to an interactive driver information system 3. On its display 3.1, which may take the form, for instance, of a touch screen 3.2, the respective shift-program modules are offered in block form within a selection menu 140 to which auxiliary functions for individual functions may be allocated, so that within selection menu 140, the user is able to individually configure electronic transmission control unit 2 of automatic transmission 1 of the motor vehicle in a manner conforming to his/her individual wishes and needs.

Also in the representation according to FIG. 2, an insertion slot 144 for receiving a chip card 143 is provided in schematic form on interactive driver information system 3. Via chip card 143, a shift-program configuration, stored in a manner individual to the user, may be read into interactive driver information system 3 and stored, so that a corresponding configuration of electronic transmission control unit 2 is possible by reading out the information present in coded form on chip card 143. Moreover, in schematic representation, interactive driver information system 3 is assigned an interface 147 in the form of a microphone, via which, through voice input 148— indicated by the arrow in FIG. 2—electronic transmission control unit 2 may be configured by voice.

Selection menu 140, able to be displayed on display 3.1 of interactive driver information system 3, may include shift programs 10 through 120 depicted by way of example in FIG. 2. In the configuration of selection menu 140 according to the representation in FIG. 2, the individual shift programs, able to be activated, deactivated or altered with respect to their operating parameters, are represented side-by-side in a manner equal in rank. In this connection, to be understood by equal in rank is that the user does not have to make any preselection when calling up selection menu 140 on display 3.1 of interactive driver information system 3, but rather is able to move freely within the selection menu and may freely undertake the configuration of electronic transmission control unit 2. An arrangement of shift programs, able to be activated/deactivated or altered with respect to their operating parameters, that is put together from hierarchical points of view can be gathered from the representation in FIG. 3 below.

On display 3.1 of interactive driver information system 3, for example, a shift program "sport" 10 may be offered within selection menu 140. Within this shift program 10, an early upshift of automatic transmission 1 may be prevented by a characteristic curve stored in electronic transmission control unit 2, so that sporty-type drivers are able to take full advantage of the accelerating ability of the motor-vehicle combustion engine allocated to automatic transmission 1 at its input end 1.2. Instead of the shift program "sport" represented by a functional block 10 in FIG. 2, further shift programs of this category supporting a sporty driving style may be offered to the user within selection menu 140; however, they are not specified in the representation according to FIG. 2. Within selection menu 10 on display 3.1 of interactive driver information system 3, a shift program "sport" may either be transferred by a selection 10.1 into an activated state, or switched into a deactivated state by a selection 10.2.

In addition, within selection menu 140 on display 3.1 of interactive driver information system 3, a shift program "economy" 20 may be switched via selection 20.1 into an activated state, or via selection 20.2 into a deactivated state. Suitable selection 20.1 or 20.2 is supplied to electronic transmission control unit 2 of automatic transmission 1 via the interface, not shown in FIG. 2, in the form of a serially operating bus system 5. As a rule, a shift program "economy" is designed in such a way that an early upshift limiting the speed of the combustion engine is carried out, so that an operating mode favorable from the standpoint of fuel consumption may be reached via automatic transmission 1 at the combustion engine of the motor vehicle.

Within selection menu 140 on display 3.1 of interactive driver information system 3, a shift program "kickdown" 30 may also be activated or deactivated, the user having to make a corresponding selection 30.1 or 30.2. Depending upon selection 30.1 or 30.2 of shift program "kickdown" 30, upon complete depression of the accelerator up to its limit stop—which may be necessary, for instance, during passing maneuvers on highways—a downshift of automatic transmission 1 is achieved, so that the accelerating ability of the combustion engine allocated to automatic transmission 1 is suddenly available.

Moreover, a shift program "fast-off" 40 is offered to the user individually configuring electronic transmission control unit 2 via selection menu 140. The user may activate or deactivate this shift program 40 via selection 40.1 and 40.2, respectively, within selection menu 140. "Fast-off" shift program 40 always becomes active when the driver of the motor vehicle quickly releases the accelerator. If this shift program 40 disturbs the motor-vehicle driver, he/she may deactivate it by selection 40.2 when configuring electronic transmission control unit 2 of automatic transmission 1.

Within selection menu 140, the user is also given the possibility of configuring a shift program "downhill driving" 50, that is, to activate it by selection 50.1 and to transfer it into a deactivated state by selection 50.2. Within the shift program "downhill driving", for example, it is possible to prevent an upshift of automatic transmission 1 of the motor vehicle, so that the braking action of the combustion engine remains effective in the overrun (trailing throttle) state of the motor vehicle during downhill driving, and the brake system of the motor vehicle can be protected from overheating. Also available to the user configuring electronic transmission control unit 2 within selection menu 140 is a shift program "curve" which may be transferred into an activated state by a selection 60.1, and into a deactivated state via a selection 60.2. When going through curves, acceleration phases and braking phases often occur in order to control the motor vehicle through the curves. The gear shifts inevitably occurring in this context may be adapted to this driving condition via electronic transmission control unit 2 of automatic transmission 1, and may take place early or at later points of time during the driving cycle, i.e., after going through the curve.

Also offered to the user within selection menu 140 on display 3.1 of interactive driver information system 3 is a shift program "trailer" 70 which the user is able to transfer into its activated state by selection 70.1, and into the deactivated state by selection 70.2. Within the shift program "trailer" 70, electronic transmission control unit 2, in accordance with selection 70.1, operates automatic transmission 1 of the motor vehicle in a mode which ensures that the combustion engine is not operated in low-speed fashion, but rather always in the appropriate state making it possible to move the hitched load, and within a modification step during downhill driving of the motor vehicle towing a trailer, ensures that an increased braking action of the combustion engine remains effective on the vehicle combination made of the towing motor vehicle and the towed trailer.

Within a shift program "winter" 80, wintry road conditions may be taken into consideration at electronic transmission control unit 2 of automatic transmission 1. For example, within shift program "winter" 80, automatic transmission 1 may be influenced in such a way via electronic transmission control unit 2 that a drive-off start of the motor vehicle always takes place in second gear, thereby preventing the driven wheels of the motor vehicle from spinning. This shift program "winter" 80, which the user is able to activate in accordance with selection 80.1 and deactivate in accordance with selection 80.2 depending on the state of the weather, supports the action of an ESP or ABS system used in the motor vehicle with respect to the handling ability of the vehicle in critical driving situations.

Within a shift program "number of gears preselection" 90, the user may activate or deactivate it via a selection 90.1 and 90.2, respectively. If the shift program "number of gears preselection in automatic mode" 90 is activated, for example, the number of gears 90.1 configured in standard manner and set in electronic transmission control unit 2 in the automatic mode may be retained. If the user makes selection 90.2 within selection menu 140, then the number of gears may be changed. A change in the number of gears, used within the automatic mode, at automatic transmission 1 may lead to an increase 90.3 of the number of gears used or to its decrease 90.4. Therefore, the user configuring electronic transmission control unit 2 is able to preselect individually how many gears at automatic transmission 1 are used and which gears, for example, a very high fifth or sixth gear, are able to be deactivated.

Moreover, within selection menu 140 on display 3.1 of interactive driver information system 3, a shift program "standing decoupling" 100 is available which partially opens the clutch when the vehicle is stationary and in the event of a braking by the driver. The force with which the vehicle attempts to start moving is thereby reduced. This force is generated in that the torque converter rotates with idling speed on the drive end and has stopped on the output end. When the torque converter is not stopped on the output end, but rather is rotating, the torque delivered by the torque converter is reduced. This produces a comfort advantage—the driver only needs to apply the brakes lightly—as well as a consumption advantage, since the losses in the torque converter are lower.

This shift program "standing decoupling" 100 may be activated or deactivated via selection 100.1 and 100.2, respectively.

Furthermore, within selection menu 140 on display 3.1 of interactive driver information system 3, the speed of the gear change for downshifts may be altered within a shift program 110 "gear-change speed" by a selection 110.1 and 110.4, respectively. A variation of the gear-change speed may lead both to an increase 110.2 in the speed of the gear change and to a decrease 110.3 in the speed of the gear change. Along the same lines, the speed of the gear change for upshifts may be increased by selection 110.5 or lowered by selection 110.6. Moreover, in selection menu 140 on display 3.1 of interactive driver information system 3, the speed of the gear change or also the speed of the transmission-ratio changes for CVT transmissions may be altered by the driver within shift program 110 by a selection 110.1 or 110.4. Thus, a driver who is more comfort-oriented is able to set a slow gear change, and a driver who is more sporty-oriented is able to bring about a rapid gear change. For example, the selection takes place separately according to upshifts and downshifts, and as a function of the shift program and the gear to be engaged.

Within selection menu 140 on display 3.1 of driver information system 3, a function may also be activated or deactivated by which it is possible to detect a driver type. From the previous driving style of the driver using the motor vehicle, it is possible to infer the driving style of the driver based on the frequency of the braking processes or other driving maneuvers. The function "driver-type detection" 120 is to be regarded as a learning function. A driver-type detection analyzes whether the driver has a certain driving style based on the driver actions. In general, a differentiation is made between economical and sporty driver type. Characteristic for the driver-type detection is, for example, how much gas the driver uses to start from rest, whether he/she often drives using a great deal of gas (relative to the vehicle speed) or more likely with a constant accelerator, whether the driver often activates the kickdown switch, often activates the fast-off function, has a high lateral acceleration in curves, etc. An economical or a sporty shift program is automatically used depending upon the driver type detected. The action of the driver-type detection may, for example, be switched off or its effect reduced by the configurability of the driver-type detection according to the method of the present invention.

Finally, within selection menu 140 on display 3.1 of interactive driver information system 3, a shift program "number of gears preselection manual shift" may be carried out. Within this shift program, the undertaking of gearshifts may be specified by the driver to automatic transmission 1 via electronic transmission control unit 2; that is to say, the driver stipulates the shift commands himself. In this manner, characteristic shift curves stored within electronic transmission control unit 2 are deactivated; individual shifting similar to a manual transmission may be carried out, however, using an automatic transmission 1.

Shift programs 10, 20, 30, 40, 50, 60, 70, 80, 90, 100, 110 and 120, indicated in FIG. 2 in accordance with their numerical sequence, may be combined with each other so that, for example, the electronic transmission control unit may be adapted to wintry road conditions, to pass drives, to drives with and without trailer, as well as to curvy stretches in the mountains with long incline or long decline passages.

In FIG. 2, the configuration of electronic transmission control unit 2 is shown in terms of a display 3.1 of an interactive driver information system 3, which is permanently installed within a motor vehicle. In addition, electronic transmission control unit 2 may also be suitably configured via interface 4.3. To that end, interface 4.3 on electronic control unit 4 may be addressed directly via a mobile telephone 141 or via a personal digital assistant 142. Via these mobile components, electronic transmission control unit 2 may be configured in accordance with the individual desires of a user of the motor vehicle, for example, before commencing a vacation trip. If the motor vehicle is used by persons other than the driver who normally uses it, shift programs 10, 20, 30, 40, 50, 60, 70, 80, 90, 100, 110 and 120 may be configured via user-individual chip cards 143 which are insertable into an insertion slot 144 on the interactive driver information system. The desired configuration stored in coded form on chip cards 143 may be transmitted via electronic control unit 4 by way of serial bus system 5 directly to electronic transmission control unit 2 of automatic transmission 1.

In addition to selecting individual shift programs 10, 20, 30, 40, 50, 60, 70, 80, 90, 100, 110, 120 within a selection menu 140 on a touch screen 3.2 of interactive driver information system 3, the specific shift programs may also be selected via voice input 148. To that end, interactive driver information system 3 may include an interface provided as microphone 147, so that the user of interactive driver information system 3 is able to individually configure electronic transmission control unit 2 by answering yes or no within selection menu 140 without the necessity of designing display 3.1 of the interactive driver information system as touch screen 3.2.

FIG. 3 shows the shift-program functional blocks combined in hierarchical arrangement to form separate "function packets" that are configurable individually by the user of the motor vehicle.

In the representation according to FIG. 3, within selection menu 140, which is offered on display 3.1 of interactive driver information system 3, shift program 10 "sport" and shift program 20 "economy" are selected to be hierarchically superordinate.

In this embodiment variant of the method proposed according to the present invention, selected shift program "sport" 10 may include a shift program "kickdown" 30, to be considered as a subprogram, which may be activated or deactivated by a selection 30.1 or a selection 30.2 within selection menu 140. Moreover, as a subprogram to shift program "sport" 10, shift program "fast-off" 40 may be activated or deactivated by a corresponding selection 40.1 and 40.2, respectively. Finally, by activating or deactivating shift program "number of gears preselection automatic mode" 90 and shift program "gear-change speed" 110, further configuration possibilities can be offered, of which the driver may, but does not necessarily have to, make use when configuring electronic transmission control unit 2. Thus, for example, the number of gears 90.1 predefined in shift program "number of gears preselection automatic mode" 90 may be retained; in addition, it may definitely be altered, i.e., increased or decreased, within a selection 90.2. This is left to the individual preference of the user configuring electronic transmission control unit 2 and to his/her discretion. Accordingly, a shift program "sport" 10 may be configured that is customized to the user, which opens up the possibility for the user to make a suitable selection from shift programs 30, 40, 90 and 110, subordinate to superordinate shift program "sport" 10, by activating or deactivating them.

In addition, in the representation according to FIG. 3, shift program "economy" 20 is selected as a hierarchically superordinate shift program. A plurality of shift programs 30, 40, 50, 60, 70, 80 and 110 may be inserted as hierarchically subordinate shift programs after shift program "economy" 20. Shift program "kickdown" 30, shift program "fast-off" 40, shift program "downhill driving" 50, shift program "cornering" 60, shift program "trailer" 70, shift program "winter" 80 and shift program "gear-change speed" 110 may be offered to the user, i.e., to the person configuring electronic transmission control unit 2, by way of the user guidance within selection menu 140 displayed on display 3.1 of interactive driver information system 3. In accordance with selection 30.1, 30.2 to be made with respect to shift program 30, or selection possibilities 40.1 and 40.2 with respect to shift program 40, as well as selection possibilities 50.1 and 50.2 for shift program 50, and selection possibilities 60.1 and 60.2 for shift program 60, the user is able to select the activation or deactivation of the shift program in question within selection menu 140.

In analogous manner, by suitable selection 70.1 or 70.2, the user is able to activate or deactivate shift program "trailer" 70, or also to activate or deactivate shift program "winter" 80 according to the weather conditions and the road condition. Moreover, within the hierarchically superordinate shift program "economy", it is queried whether upshift or downshift speed 110.1 and 110.4, respectively, should be changed within subordinate shift program "gear-change speed" 110. The user is able to make use of this variation of the configuration of the electronic transmission control unit, but does not necessarily have to; rather, this is left completely to his/her discretion. Using the method proposed in the present invention, the driver of the motor vehicle is able to configure the shift behavior of automatic transmission 1 as desired according to his/her personal preference. Individual shift programs 10, 20, 30, 40, 50, 60, 70, 80, 90, 100, 110, 120 may be activated or deactivated, for example, via selection menu 140 on display 3.1 of interactive driver information system 3. Help functions may be called up for the individual shift programs offered, to explain in greater detail the meaning of shift programs 10, 20, 30, 40, 50, 60, 70, 80, 90, 100, 110, 120 within selection menu 140. Instead of an interactive driver information system, represented in FIGS. 2 and 3 in connection with selection menu 140, which is permanently installed in the vehicle, electronic transmission control unit 2 may also be configured by way of a mobile telephone 141 or a personal digital assistant 142 via interface 2.3 on electronic transmission control unit 2. This interface 2.3 (blue tooth) may also be situated at the central vehicle computer. The data necessary for the user-individual configuration of electronic transmission control unit 2 may also be stored on a chip card 143 which allows a user-dependent setting, i.e., configuration of electronic transmission control unit 2 of automatic transmission 1.

A change in the configuration of the electronic transmission control unit during the drive is preferably avoided. Changes are not accepted during the drive, or are only accepted after a specific confirmation by the driver of the motor vehicle. For example, the configuration of electronic transmission control unit 2 for automatic transmission 1 of the motor vehicle may be transmitted from control unit 4 of interactive driver information system 3 to electronic transmission control unit 2 after the ignition is switched on. During running operation, changes in the configuration are transmitted via a transmission element provided, for example, as serial bus system 5. The communication between electronic transmission control unit 2 and interactive driver information system 3 preferably also takes place via this serial bus system 5, provided, for example, as a CAN, within the motor vehicle.

What is claimed is:

1. A method for configuring an electronic transmission control unit of an automatic transmission having one or more selectable transmission ratios in a motor vehicle, comprising:
storing shift programs for settings of the transmission ratios of the transmission within an electronic transmission control unit;
offering selectable shift programs to a user in a form of a selection menu on a display of an input unit for configuring an electronic transmission control unit;
selecting by the user an individually compiled selection of at least two shift programs from the shift programs offered via at least one of: activation of the offered shift programs, deactivation of the offered shift programs, and modification of at least one operating parameter of the offered shift programs, the selection being recorded by the input unit;
transmitting data concerning the individually compiled selection of the selectable shift programs from the input unit to the electronic transmission control; and
configuring the shift programs stored in the electronic transmission control unit according to the individually compiled selection of the selectable shift programs.

2. The method as recited in claim 1, wherein the electronic transmission control transmits the selectable shift programs via data lines to the input unit prior to the selection by the user.

3. The method as recited in claim 1, wherein the electronic transmission control unit is configured via an interactive driver information system which exchanges signals with the electronic transmission control unit via a serial bus system.

4. The method as recited in claim 1, wherein the electronic transmission control unit is configured via a mobile telephone.

5. The method as recited in claim 1, wherein the electronic transmission control unit is configured via a personal digital assistant.

6. The method as recited in claim 1, wherein the electronic transmission control unit is configured via a chip card upon which a user-individual configuration of the electronic transmission control unit is stored.

7. The method as recited in claim 1, wherein the electronic transmission control unit is configured via an interface that is able to be addressed by way of at least one of a mobile telephone and a personal digital assistant.

8. The method as recited in claim 1, wherein the selectable shift programs include at least one of a shift program "sport", a shift program "economy", a shift program "kickdown", a shift program "fast-off", a shift program "downhill driving", a shift program "cornering", a shift program "trailer", a shift program "winter", and a shift program "standing decoupling".

9. The method as recited in claim 8, wherein the selectable shift programs are configured in a user-individual manner via a selection menu on an interactive driver information system into an activated state or a deactivated state.

10. The method as recited in claim 8, wherein the selectable shift programs include a driver-type-detection function which is able to be activated or partially deactivated.

11. The method as recited in claim 8, wherein the selectable shift programs are selectable individually, in a manner equal in rank, by the user via a selection menu on a driver information system, via a mobile telephone, and via a personal digital assistant.

12. The method as recited in claim 8, wherein the selectable shift programs, the shift program "sport"or the shift program "economy"are selectable, which, within subordinate hierarchy steps, are linked in a user-individual manner to others of the selectable shift programs.

13. The method as recited in claim 1, wherein the selectable shift programs include at least one of a shift program "number-of-gears preselection automatic transmission", a shift program "shifting-speed change gear-change speed", and a function "driver-type detection".

14. The method as recited in claim 13, wherein the selectable shift programs are configured in a user-individual manner into an activated state or a deactivated state via one of a selection menu of an interactive driver information system, a mobile telephone or a personal digital assistant.

15. The method as recited in claim 13, wherein within the selectable shift programs, a number of gears of a transmission is changeable individually in a change step, and can be both increased and decreased.

16. The method as recited in claim 13, wherein within the selectable shift programs, a shifting speed of a gear change is alterable, and both a downshift speed can be increased or decreased and an upshift speed can be increased or decreased.

17. The method as recited in claim 1, wherein the selectable shift programs within the selection menu are selected by a voice input at an interface of an interactive driver information system permanently installed in the vehicle or via a mobile telephone.

18. A device for configuring an electronic transmission control unit of an automatic transmission having one or more selectable transmission ratios in a motor vehicle, comprising:
a storage device storing shift programs; and
an interface able to be addressed via a mobile telephone or a personal digital assistant, for configuring the shift programs according to an individually compiled selection of at least two shift programs, at least one of the shift programs being able to be activated in a user-individual manner, the shift programs being able to be deactivated in a user-individual manner, and shift-program parameters being alterable in a user-individual manner.

19. A device for configuring an electronic transmission control unit of an automatic transmission having one or more selectable transmission ratios in a motor vehicle, comprising:
a storage device storing selectable shift programming; and
an electronic control unit of a driver information system permanently installed in the vehicle, having a selection menu using which a user selects an individually compiled selection of at least two shift programs from the individually selectable shift programs by at least one of: activating the shift programs in a user-individual manner, deactivating the shift programs in a user-individual manner, and modifying shift-programs parameters in a user-individual manner.

20. The device according to claim 19, wherein the electronic transmission control unit is configured via the electronic control unit using a serial bus.

21. The device according to claim 19, wherein the interactive driver information system includes an interface at which a chip card is able to be read that contains a user-individual configuration of the electronic transmission control unit in coded form.

22. The device according to claim 19, wherein the driver information system includes a microphone for sensing a voice input.

\* \* \* \* \*